(12) United States Patent
Czapla et al.

(10) Patent No.: US 11,242,821 B2
(45) Date of Patent: Feb. 8, 2022

(54) TURBOFAN COMPRISING A SYSTEM COMPRISING FLEXIBLE SCREENS FOR CLOSING OFF THE BYPASS DUCT

(71) Applicant: Airbus Operations SAS, Toulouse (FR)

(72) Inventors: Lionel Czapla, Toulouse (FR); Benjamin Thubert, Toulouse (FR); Julien Le Fanic, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 17/140,717

(22) Filed: Jan. 4, 2021

(65) Prior Publication Data
US 2021/0207557 A1 Jul. 8, 2021

(30) Foreign Application Priority Data
Jan. 6, 2020 (FR) ..................................... 2000067

(51) Int. Cl.
*F02K 1/72* (2006.01)
*F02K 1/76* (2006.01)

(52) U.S. Cl.
CPC ............... *F02K 1/72* (2013.01); *F02K 1/763* (2013.01); *F05D 2220/323* (2013.01); *F05D 2220/36* (2013.01)

(58) Field of Classification Search
CPC ........ F02K 1/72; F02K 1/763; F05D 2220/36; F05D 2220/323
See application file for complete search history.

(56) References Cited

U.S. PATENT DOCUMENTS

| 2,933,890 | A  |   | 4/1960  | Morrison |
|-----------|----|---|---------|----------|
| 3,366,349 | A  |   | 1/1968  | Rudis    |
| 10,830,089| B2 | * | 11/2020 | Gardes .................. F01D 17/167 |
| 2015/0176529 | A1 | * | 6/2015 | Todorovic ................ F02K 1/72 |
|           |    |   |         | 239/265.19 |

(Continued)

FOREIGN PATENT DOCUMENTS

| EP | 3540203 A1 | 9/2019 |
| FR | 3076864 A1 | 7/2019 |

OTHER PUBLICATIONS

French Search Report; priority document.

*Primary Examiner* — Lorne E Meade
(74) *Attorney, Agent, or Firm* — Greer, Burns & Crain, Ltd.

(57) ABSTRACT

A turbofan having a nacelle delimiting a duct for a bypass flow and including a fixed structure including a guide vane support with guide vanes, a mobile cowl movable in translation between an advanced position and a retracted position, arms, each one being mobile in rotation on the guide vane support between a stowed position and a deployed position and comprising a distal end and a proximal end, for each pair of adjacent arms, a flexible screen extending angularly between the two arms, and of which an exterior edge is attached to the guide vane support, and wherein the distal end of each arm is fixed along the interior edge, a link rod mounted articulated between the distal ends, actuators to cause the mobile cowl to move, and an operating system which moves each arm. Such an arrangement allows a reduction in weight.

7 Claims, 3 Drawing Sheets

(56) References Cited

U.S. PATENT DOCUMENTS

| | | | |
|---|---|---|---|
| 2016/0201601 A1* | 7/2016 | Nakhjavani | F02K 1/763 239/1 |
| 2017/0342941 A1* | 11/2017 | Mears | F02K 1/72 |
| 2019/0284952 A1 | 9/2019 | Gardes et al. | |
| 2020/0347800 A1 | 11/2020 | Gonidec et al. | |

* cited by examiner

TURBOFAN COMPRISING A SYSTEM COMPRISING FLEXIBLE SCREENS FOR CLOSING OFF THE BYPASS DUCT

CROSS-REFERENCES TO RELATED APPLICATIONS

This application claims the benefit of the French patent application No. 2000067 filed on Jan. 6, 2020, the entire disclosures of which are incorporated herein by way of reference.

FIELD OF THE INVENTION

The present invention relates to a turbofan which comprises flexible screens and a set of mobile arms mounted so as to be able to rotate in order to block the duct for the bypass flow, and to an aircraft comprising at least one such turbofan.

BACKGROUND OF THE INVENTION

An aircraft includes a fuselage, to each side of which is fixed a wing. Under each wing is suspended at least one turbofan. Each turbofan is fixed under the wing by means of a pylon fixed between the structure of the wing and the structure of the turbofan.

The turbofan comprises a motor and a nacelle that is fixed around the motor. The turbofan has, between the nacelle and the motor, a bypass duct in which a bypass flow flows.

The nacelle comprises a plurality of reversal doors, each one being mobile in rotation on the structure of the nacelle, between a stowed position in which it is not in the bypass duct and a deployed position in which it is positioned across the bypass duct in order to redirect the bypass flow towards a window which is in the wall of the nacelle and which is open between the bypass duct and the outside of the nacelle.

Thus, the bypass flow is redirected to the outside and more specifically towards the front of the engine in order to generate reverse thrust.

Although reversal doors are entirely satisfactory, it is desirable to find different mechanisms, in particular more lightweight mechanisms.

SUMMARY OF THE INVENTION

One object of the present invention is to propose a turbofan which comprises a flexible screen and a set of arms which are mounted so as to be able to rotate in order to block the duct of the bypass flow.

To that end, a turbofan is proposed having a longitudinal direction and comprising a motor and a nacelle, surrounding the motor, which comprises a fan casing, in which a duct for a bypass flow is delimited between the nacelle and the motor, and in which a flow of air flows in a flow direction, the nacelle comprising:

- a fixed structure fixed to the fan casing and comprising a guide vane support bearing guide vanes,
- a mobile cowl able to move in translation, on the fixed structure, in a direction of translation between an advanced position in which the mobile cowl is positioned such that it is moved close to the fan casing and an extended position in which the mobile cowl is positioned such that it is moved away from the fan casing so as to define, between them, an open window between the duct and the exterior of the nacelle, and facing the guide vanes,
- a plurality of arms, each one comprising a distal end and a proximal end which is mounted so as to be mobile in rotation on the guide vane support about an axis of rotation parallel overall to the longitudinal direction, wherein each arm is mobile between a stowed position in which the arm is outside the duct and a deployed position in which the arm is across the duct,
- for each pair of adjacent arms, a flexible screen extending angularly between the two arms and adopting the form of a portion of an annulus with an exterior edge having a large radius and an interior edge having a small radius, wherein the exterior edge is attached to the guide vane support rearward of the guide vanes, and wherein the distal end of each arm of the pair is fixed along the interior edge of the flexible screen,
- for each pair of arms, a link rod, of which one end is mounted articulated to the distal end of one of the arms of the pair, and the other end is mounted articulated to the distal end of the other arm of the same pair,
- a set of actuators causing the mobile cowl to move between the advanced position and the extended position, and vice versa, and
- an operating system configured to move each arm from the stowed position to the deployed position when the mobile cowl passes from the advanced position to the extended position, and to move each arm from the deployed position to the stowed position when the mobile cowl passes from the extended position to the advanced position.

Replacing the reversal doors and their drive mechanisms with the flexible screens and the set of rotationally-mobile arms allows a reduction in weight. Furthermore, the presence of several screens means that, where necessary, only one screen needs to be replaced.

Advantageously, the flexible screen is made up of a structure of flexible mesh to which a flexible skin is attached.

Advantageously, between its proximal end and its distal end, each arm comprises a guide groove which extends between the two ends and in which there slides at least one slider secured to the flexible screen.

Advantageously, the nacelle comprises a plate in the shape of a portion of an annulus, secured to the guide vane support and on which the arms are mounted with the ability to rotate.

Advantageously, the operating system comprises:
- a cam secured to an arm and having a tooth,
- a groove, made on the mobile cowl and in which the tooth is received, and wherein, when the mobile cowl moves, the tooth follows the groove and rotates the arm secured to the tooth, and
- for each arm, a transmission system which transmits the movement of the arm to the next arm.

Advantageously, the transmission system comprises, for two adjacent arms, a connecting rod mounted articulated between the two arms, and the point of articulation of the connecting rod to each arm is offset with respect to the axis of rotation of the arm.

The invention also proposes an aircraft comprising at least one turbofan according to one of the preceding variants.

BRIEF DESCRIPTION OF THE DRAWINGS

The abovementioned features of the invention, along with others, will become more clearly apparent upon reading the following description of an exemplary embodiment, the description being given with reference to the appended drawings, in which.

DETAILED DESCRIPTION OF THE PREFERRED EMBODIMENTS

Figure 1:
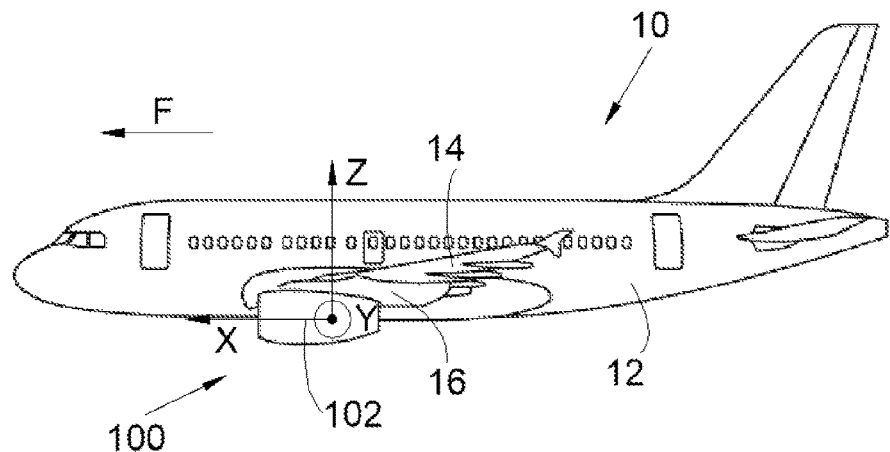
FIG. 1 is a side view of an aircraft comprising a turbofan according to the invention.

In the following description, terms relating to a position are considered with reference to the direction of forward travel of an aircraft, as indicated in FIG. 1 by the arrow F.

FIG. 1 shows an aircraft 10 that comprises a fuselage 12, to each side of which is fixed a wing 14 that bears at least one turbofan 100 according to the invention. The turbofan 100 is fixed under the wing 14 by means of a pylon 16.

Figure 2:
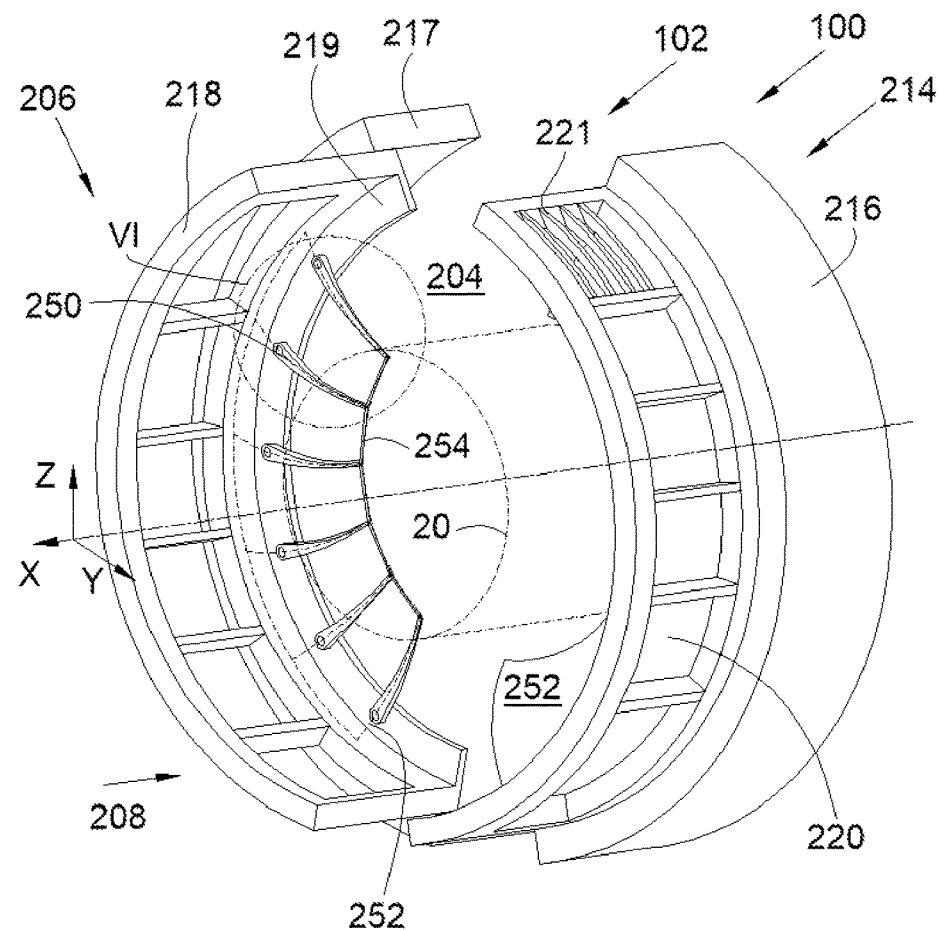
FIG. 2 is a perspective view of the turbofan according to the invention in the extended and deployed position.
Figure 3:
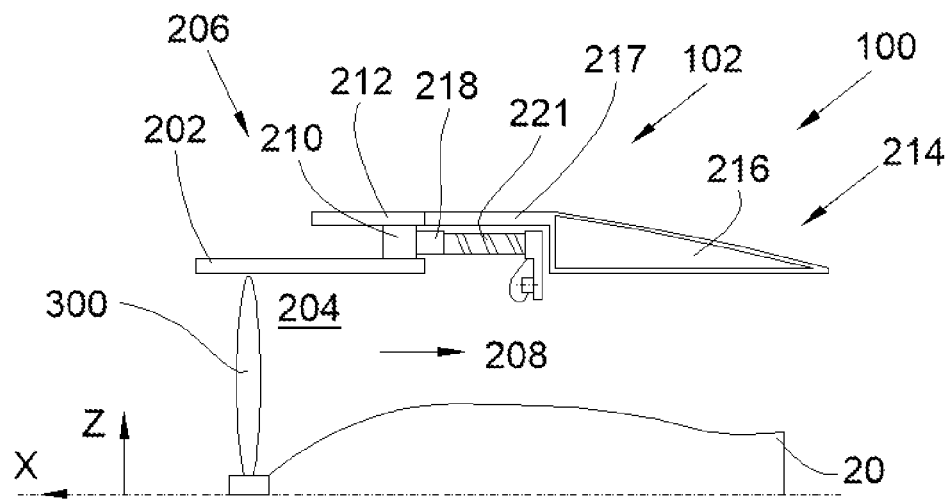
FIG. 3 is a schematic representation of a turbofan according to the invention, viewed in vertical section.

FIGS. 2 and 3 show the turbofan 100 which includes a nacelle 102 and a motor 20 that is housed inside the nacelle 102. The turbofan 100 also comprises a fan casing 202. In FIG. 2, the motor 20 is shown in chain line as a cylinder.

In the following description, and by convention, X denotes the longitudinal direction of the turbofan 100 that is parallel to the longitudinal axis of the aircraft 10 oriented positively towards the front of the aircraft 10, Y denotes the transverse direction that is horizontal when the aircraft is on the ground, and Z denotes the vertical direction, these three directions X, Y and Z being mutually orthogonal.

FIG. 2 shows the turbofan 100, and FIG. 3 shows a schematic representation in section of the turbofan 100.

The turbofan 100 has, between the nacelle 102 and the motor 20, a duct 204 in which flows a bypass flow 208 coming from the air intake through a fan 300, and which therefore flows in the flow direction from front to rear.

The nacelle 102 has a fixed structure 206 that is mounted fixed on the fan casing 202. The fixed structure 206 is made up, in particular here, of a front frame 210 mounted around the fan casing 202 and of outer panels 212 fixed to the front frame 210 and forming an exterior aerodynamic surface.

The nacelle 102 has a mobile assembly 214 which has a mobile cowl 216 which forms the exterior walls of the nozzle.

The fixed structure 206 also has a guide vane support 218 which takes the form of a cylinder with perforated walls, between which sets of guide vanes 221 are arranged. In this case, the guide vane support 218 is attached to the front frame 210.

In the embodiment of the invention shown in FIGS. 2 and 3, the mobile cowl 216 has an exterior wall 217 which is cylindrical and which surrounds the guide vane support 218.

The mobile cowl 216 is mounted mobile in translation in a translation direction globally parallel to the longitudinal direction X on the fixed structure 206 of the nacelle 102.

The mobile cowl 216 is mobile between an advanced position (FIG. 3) and a extended position (FIG. 2) and vice versa. In the advanced position, the mobile cowl 216 is positioned as far forward as possible, with respect to the flow direction, such that the mobile cowl 216 is moved close to the outer panels 212 and to the fan casing 202 and thus forms a continuous aerodynamic surface. In the extended position, the mobile cowl 216 is positioned as far aft as possible, with respect to the flow direction, such that the mobile cowl 216 is moved away from the outer panels 212 and from the fan casing 202 so as to define, between them, a window 220 which faces the guide vanes 221 and opens between the duct 204 and the outside.

In the advanced position, the mobile cowl 216 and the outer panels 212 extend in line with one another so as to define the exterior surface of the nacelle 102. In the advanced position, the mobile cowl 216 is positioned facing the guide vanes 221, and prevents the flow of air from passing.

In the extended position, the mobile cowl 216 and the outer panels 212 are spaced apart from one another and define, between them, the open window 220 between the duct 204 and the exterior of the nacelle 102. That is to say, the air from the bypass flow 208 passes through the window 220 to end up outside the turbofan 100, passing through the guide vanes 221.

In FIG. 2, the mobile cowl 216 and the guide vane support 218 are made in two parts that are symmetrical about a vertical plane XZ. These two parts are mounted on beams of the fixed structure 206, in particular here, a 12-o'clock beam and a 6-o'clock beam which fill in the spaces between the two parts that make up the mobile cowl 216 and the guide vane support 218. Of course, the number of parts making up the mobile cowl 216 and the guide vane support 218 may be different.

The mobile cowl 216 is made to translate by any appropriate means, such as slideways between the beams of the fixed structure 206 and the mobile cowl 216.

The nacelle 102 also comprises a set of actuators (not shown) that move the mobile cowl 216 in translation between the advanced position and the extended position and vice versa. Each actuator is controlled by a control unit, for example of the processor type, which controls the movements in one direction or the other according to the requirements of the aircraft 10.

Each actuator may, for example, take the form of a double-action jack (two working directions), of which the cylinder is fixed to the fixed structure 206 and a rod is fixed to the mobile cowl 216.

The fan casing 202 and the outer panels 212 form the upstream boundary of the window 220 with respect to the direction of flow and the mobile cowl 216 forms the downstream boundary of the window 220 with respect to the direction of flow.

The nacelle 102 comprises a plurality of arms 250 having a proximal end and a distal end. At its proximal end, each arm 250 is mounted with the ability to move in rotation on the guide vane support 218, on the periphery of the duct 204 and about an axis of rotation parallel overall to the longitudinal direction X. Each arm 250 is thus able to move between a stowed position in which the arm 250 is outside of the duct 204 and is held closely against the exterior edges of the duct 204, and a deployed position (FIG. 2) in which the arm 250 extends across the duct 204.

Overall, each arm 250 extends in a plane perpendicular to the longitudinal direction X.

The number of arms 250 depends on the dimensions of the turbofan 100 and more particularly on the dimensions of each part that makes up the guide vane support 218.

The passage from the stowed position to the deployed position is via a combination of the movement of the mobile cowl 216 and of the rotation of the distal ends of the arms 250 towards the inside of the turbofan 100.

The nacelle 102 also carries an operating system (400, FIGS. 3 and 4) which moves each arm 250 from the stowed position to the deployed position when the mobile cowl 216 passes from the advanced position to the extended position, and moves each arm 250 from the deployed position to the stowed position when the mobile cowl 216 passes from the extended position to the advanced position.

The nacelle 102 also comprises, for each part making up the guide vane support 218, and for each pair of adjacent arms 250, a flexible screen 252 which can be seen transparently (in chain line) on the left in FIG. 2. Each screen 252 adopts the overall shape of a portion of an annulus about the longitudinal direction X, with an exterior edge having a large radius and an interior edge having a small radius. Angularly, each flexible screen 252 extends between the two arms of the pair. The exterior edge is attached to the guide vane support 218 rearward of the guide vanes 221, and the distal end of each arm 250 of the pair is fixed along the interior edge of the flexible screen 252.

Figure 6:
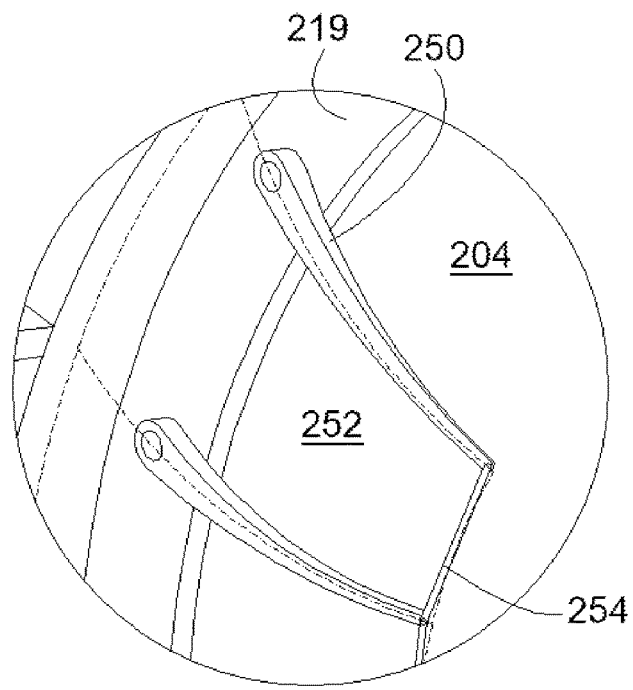
FIG. 6 is an enlarged view of detail VI of FIG. 2.

Furthermore, in order to guarantee separation of the two distal ends in the deployed position, for each flexible screen 252, namely for each pair of arms 250, the nacelle 102 comprises a link rod 254, of which one end is mounted articulated to the distal end of one of the arms 250 of the pair corresponding to the flexible screen 252, and the other end is mounted articulated to the distal end of the other arm 250 of the same pair, FIG. 6 shows an enlargement showing the link rod 254. The articulation connecting each end of the link rod 254 to the corresponding distal end preferably takes the form of a ball-joint connection.

The flexible screen 252 is positioned in front of the arms 250 and the link rod 254 with respect to the front of the aircraft 10.

When the arms 250 are in the deployed position, the flexible screen 252 is also deployed and spread out between the guide vane support 218, and the distal ends of the arms 250 form a barrier across the duct 204 which opposes the flow of the bypass flow 208 which is then redirected by the flexible screen 252 through the window 220 and the guide vanes 221. In the deployed position, the interior edge sits around the motor 20 and, as a preference, each link rod 254 has a shape which conforms to the exterior shape of the motor 20.

Positioning the flexible screen 252 forward of the arms 250 and of the link rod 254 allows the flexible screen 252 to rest on the arms 250 and the link rod 254 and thus resist the bypass flow 208.

Operation thus involves, starting from the advanced/stowed position, commanding activation of the actuators to move the mobile cowl 216 from the advanced position into the extended position, which causes the offsetting of the mobile cowl 216 with respect to the guide vane support 218. During the course of this movement, the operating system 400 moves the arms 250 from the stowed position to the deployed position, and this has the tendency to deploy the flexible screen 252 across the duct 204.

In reverse, operation thus involves, starting from the extended/deployed position, commanding activation of the actuators to move the mobile cowl 216 from the extended position into the advanced position, which causes the mobile cowl 216 to become superposed with the guide vane support 218. During the course of this movement, the operating system 400 moves the arms 250 from the deployed position to the extended position, and this has the tendency to return the flexible screen 252 to the outside of the duct 204.

The use of the arms 250 mounted so as to be able to rotate on the guide vane support 218, and the use of the flexible screen 252, makes it possible to lighten the assembly compared to the use of reversal doors of the prior art. Furthermore, the flexible screen 252 makes it possible to adjust the efficiency and the area match which characterize a thrust reverser and the area match denotes the ratio between the nozzle outlet cross section in direct-jet mode and the nozzle outlet cross section in reverse-thrust mode.

The flexible screen 252 needs to exhibit structural characteristics that are sufficient for withstanding the forces generated by the bypass flow 208 and needs to be flexible enough that it can be stowed against the edges of the duct 204 in the stowed position. According to one particular embodiment, the flexible screen 252 is made up of a structure of flexible mesh to which a flexible skin, such as a fabric for example, is attached.

Between its proximal end and its distal end, each arm 250 may comprise a guide groove which extends between the two ends and in which there slides at least one slider secured to the flexible screen 252 so as to ensure radial retention of the flexible screen 252.

Figure 4:
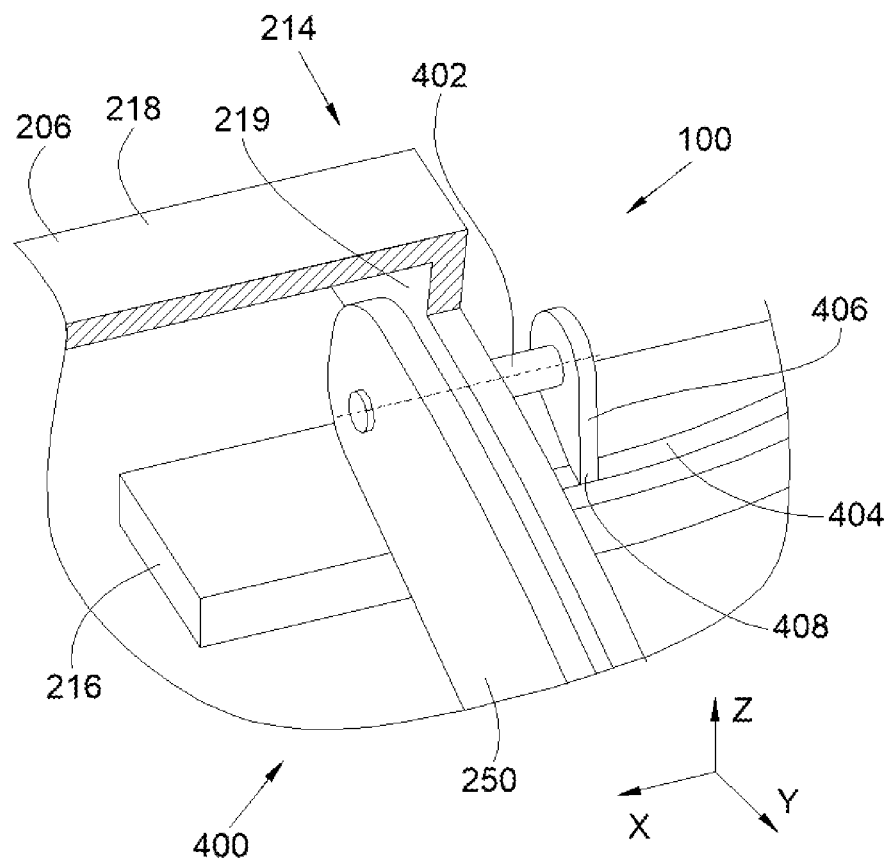
FIG. 4 is a perspective view of an embodiment detail of a transmission system according to the invention.
Figure 5:
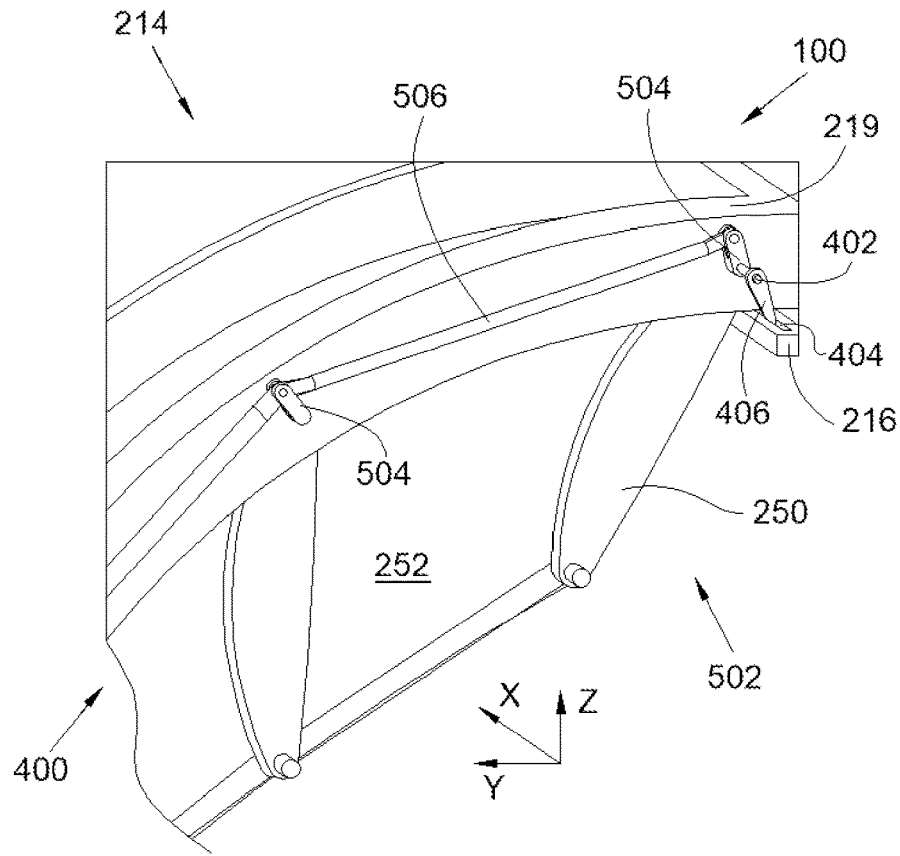
FIG. 5 is a perspective view from behind of the transmission system according to the invention.

FIGS. 4 and 5 show one particular embodiment of the operating system 400. The guide vane support 218 in FIG. 4 is partially cut away in order to reveal the insides.

In the embodiment of the invention depicted here, the nacelle 102 comprises a plate 219 which is secured to the guide vane support 218, which takes the form of a portion of an annulus and on which the arms 250 are mounted with the ability to rotate. The plate 219 extends inside the guide vane support 218.

According to one particular embodiment, for each arm 250 a shaft 402 secured to the arm 250 is mounted so as to be able to rotate at the proximal end, on the plate 219 and forms the axis of rotation of the arm 250.

In the stowed position, each arm 250 is stowed above the plate 219.

The mobile cowl 216 comprises a groove 404 which is positioned, for example, in the vicinity of the 6-o'clock or 12-o'clock beams.

The arm 250 closest to the groove 404 is equipped with a cam 406 that has a tooth 408 which is received in the groove 404. In the embodiment of the invention presented here, the cam 406 is secured to the shaft 402 and positioned on the other side from the plate 219. Of course, depending on the space available, it is possible to provide a cam 406 on several of the arms 250 and one groove 404 per cam 406.

As the mobile assembly 214 moves towards the extended position, the tooth 408 follows the groove 404 and a deviation of the groove 404 causes a rotation of the cam 406 and therefore of the arm 250 secured to the cam 406, about its axis of rotation, towards its deployed position, and vice versa.

The groove 404 has a shape which is suitable to allow the rotation of the arm 250 from the stowed position to the deployed position when the mobile cowl 216 passes from the advanced position to the extended position. Conversely, the groove 404 has a shape which is suitable to allow the rotation of the arm 250 from the deployed position to the stowed position when the mobile cowl 216 passes from the extended position to the advanced position.

The operating system 400 thus comprises the groove 404, the cam 406, and, for each arm 250, a transmission system 502 which transmits the movement of the arm 250 to the next arm 250 so that the arms then move simultaneously.

Thus, moving all of the arms 250 is relatively simple to implement and does not require actuators beyond those necessary for moving the mobile cowl 216.

The transmission system 502 comprises, for two adjacent arms 250, a connecting rod 506 mounted articulated between the two arms 250. The point of articulation of the connecting rod 506 to each arm 250 is offset with respect to the axis of rotation of the arm 250. Thus, when one of the arms 250 moves, the other arm 250 is driven in rotation by the connecting rod 506.

In the embodiment of the invention presented here, the connecting rods 506 are attached to the arms 250 via cams 504.

The invention has been more particularly described in the case of a nacelle under a wing but can be applied to a nacelle located at the rear of the fuselage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbofan having a longitudinal direction and comprising a motor and a nacelle, surrounding the motor, which comprises a fan casing, in which a duct for a bypass flow is delimited between the nacelle and the motor and in which a flow of air flows in a flow direction, said nacelle comprising:
 a fixed structure fixed to the fan casing and comprising a guide vane support bearing guide vanes,
 a mobile cowl movable in translation, on the fixed structure, in a direction of translation between an advanced position in which the mobile cowl is positioned such that the mobile cowl is moved close to the fan casing and an extended position in which the mobile cowl is positioned such that the mobile cowl is moved away from the fan casing so as to define, between them, an open window between the duct and the exterior of the nacelle, and facing the guide vanes,
 a plurality of arms, each one comprising a distal end and a proximal end which is mounted so as to be mobile in rotation on the guide vane support about an axis of rotation parallel overall to the longitudinal direction, wherein each arm is mobile between a stowed position in which the arm is outside the duct and a deployed position in which the arm is across the duct,
 for each pair of adjacent arms, a flexible screen extending angularly between each pair of adjacent arms and formed as a portion of an annulus with an exterior edge having a large radius and an interior edge having a small radius, wherein the exterior edge is attached to the guide vane support rearward of the guide vanes, and wherein the distal end of each arm of the pair of adjacent arms is fixed along the interior edge of the flexible screen,
 for each pair of adjacent arms, a link rod, of which a first end is mounted articulated to the distal end of one of the arms of the pair and a second end is mounted articulated to the distal end of the other arm of the same pair,
 a set of actuators causing the mobile cowl to move between the advanced position and the extended position, and vice versa, and
 an operating system configured to move each arm from the stowed position to the deployed position when the mobile cowl passes from the advanced position to the extended position, and to move each arm from the deployed position to the stowed position when the mobile cowl passes from the extended position to the advanced position.

2. The turbofan according to claim 1, wherein the flexible screen is made up of a structure of flexible mesh to which a flexible skin is attached.

3. The turbofan according to claim 1, wherein, between the proximal end and the distal end, each arm comprises a guide groove which extends between the proximal and distal ends and in which there slides at least one slider secured to the flexible screen.

4. The turbofan according to claim 1, wherein the nacelle comprises a plate formed as a portion of an annulus, secured to the guide vane support and on which the arms are rotatably mounted.

5. The turbofan according to claim 1, wherein the operating system comprises: a cam secured to one of the arms of the pair of adjacent arms, the cam having a tooth, the mobile cowl having a groove in which the tooth is received, and wherein, when the mobile cowl moves, the tooth follows the groove and rotates the arm secured to the tooth, and for each arm, a transmission system which transmits the movement of the arm to the adjacent arm.

6. The turbofan according to claim 5, wherein the transmission system comprises, for two adjacent arms, a connecting rod mounted articulated between said two arms, and wherein a point of articulation of the connecting rod to each arm is offset with respect to the axis of rotation of the arm.

7. An aircraft comprising at least one turbofan according to claim 1.

* * * * *